Aug. 10, 1965   A. E. CAMERON ETAL   3,199,365
THROTTLE CONTROL DEVICE
Filed March 1, 1963   2 Sheets-Sheet 1
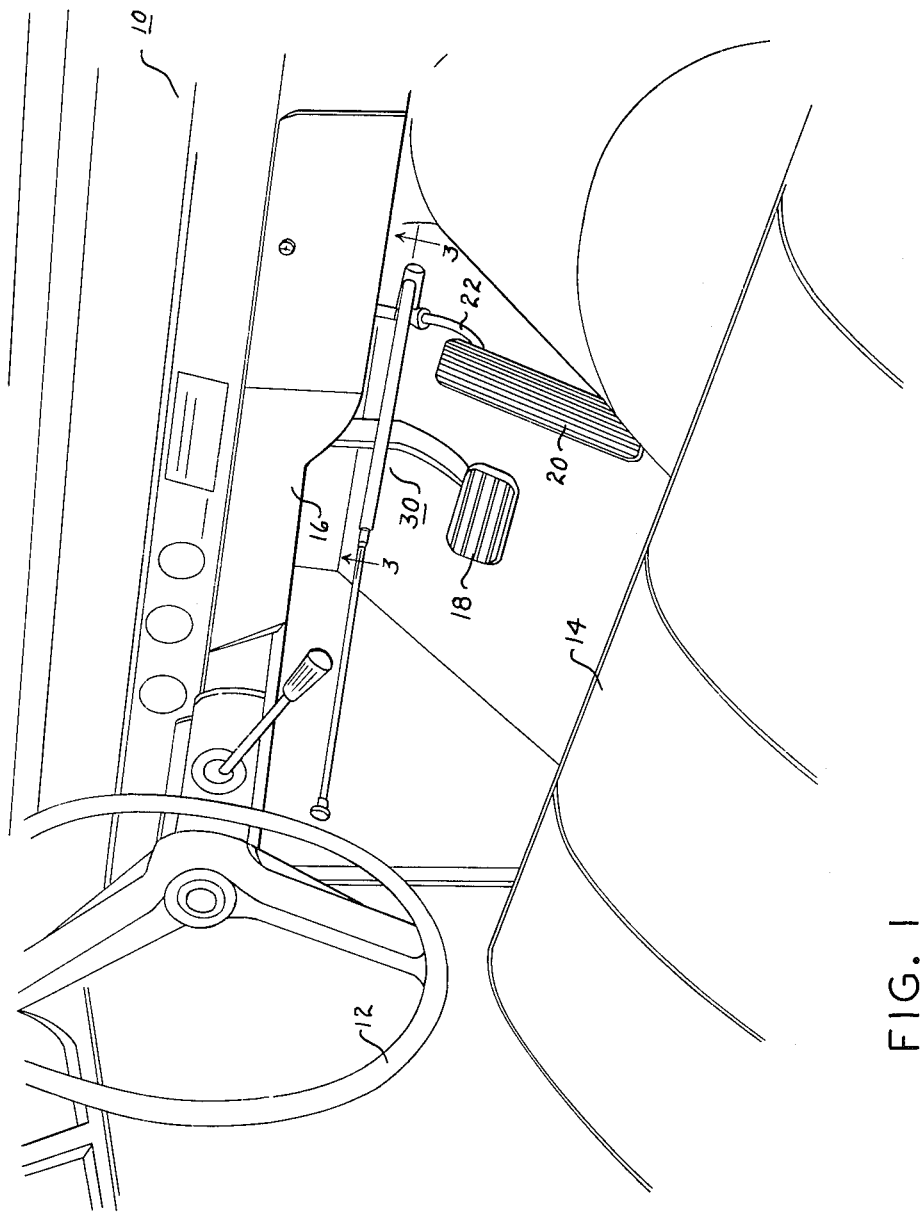
FIG. I
INVENTORS
COLIN E. CAMERON
ALLAN E. CAMERON
BY
ATTORNEYS

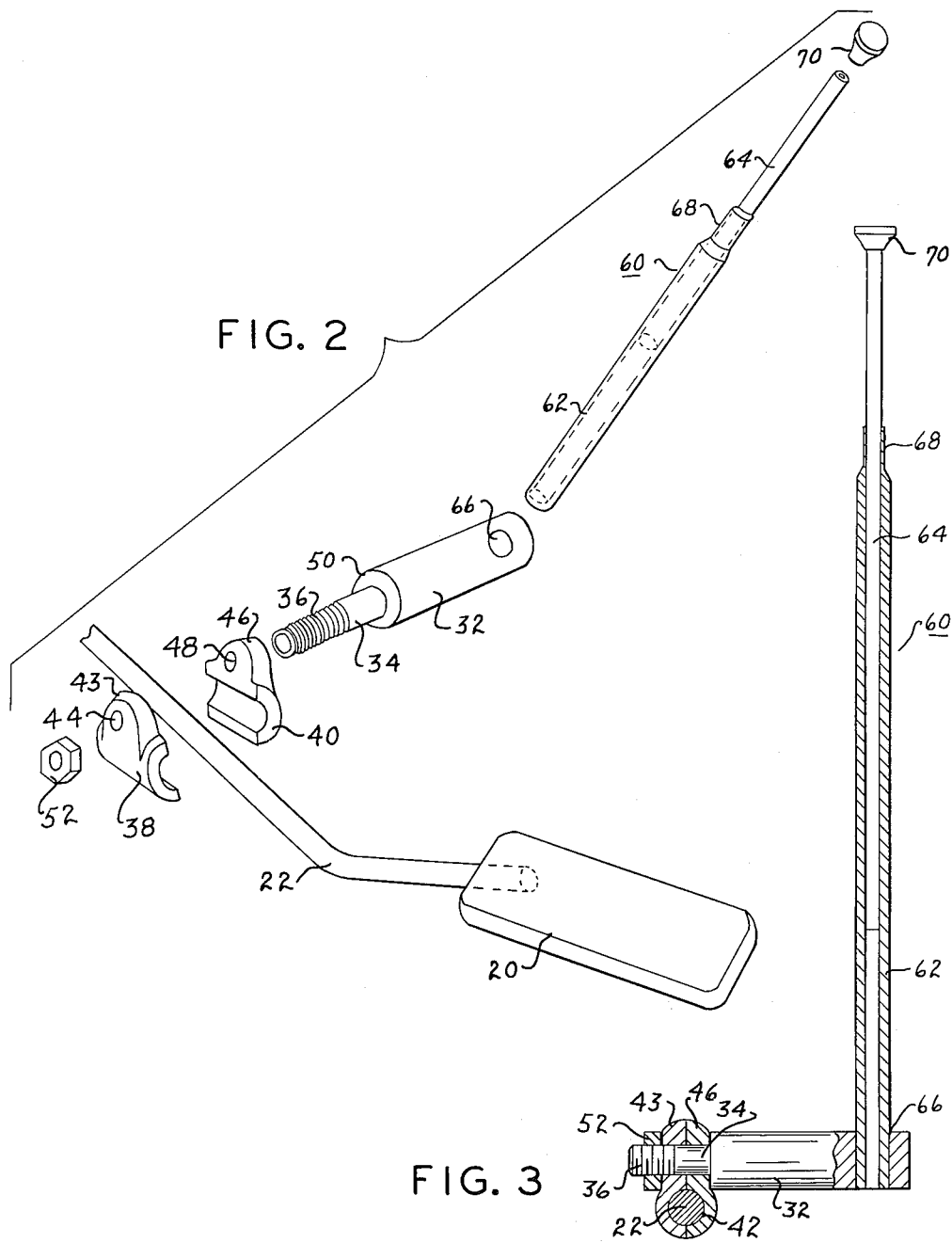

3,199,365
THROTTLE CONTROL DEVICE
Allan E. Cameron and Colin E. Cameron, both of
201 6th St., Winona Lake, Ind.
Filed Mar. 1, 1963, Ser. No. 262,073
2 Claims. (Cl. 74—482)

The present invention relates to a throttle control device and more particularly to a device for operating the accelerating pedal of a vehicle by hand.

In traveling long distances, particularly on freeways, toll roads and other superhighways, the driver or operator of the automobile, truck or bus is required to use the conventional accelerating pedal to maintain often a relatively constant speed over long periods of time, the speed usually being varied only occasionally for passing another vehicle. This continued use of the leg and foot to hold the pedal in a fixed position for extended periods of time results in excessive fatigue and discomfort to the driver. Various auxiliary devices, including automatic mechanisms, have been tried in the past for controlling the throttle to relieve the driver from the constant operation of the pedal with the foot, but those mechanisms have generally been unsatisfactory and have certain inherent disadvantages, including complexity, difficulty of installing on the vehicle after it leaves the factory, failure to give the driver complete control of the vehicle under certain operating conditions and emergencies, thus rendering them unsafe for the average driver, and interference with the normal operation and control of the vehicle by the driver or operator when the mechanism is not in use. Few modern automobiles have any type of hand control for the throttle, and the hand controls which have been incorporated initially in the automobile mechanism or installed after the vehicle has left the factory have generally been inconvenient and/or unsafe to use or interfered with the free unimpeded control of the acceleration pedal by the operator. Further, in the prior control mechanism, difficulty has been experienced in transferring control and operation of the engine between the accelerating pedal and the auxiliary control. It is therefore one of the principal objects of the present invention to provide a relatively simple and easily operated device for controlling the accelerating pedal by hand, which can be readily installed by an unskilled person by attaching the device to the accelerating pedal or linkage therefor in the driver compartment of the vehicle, and which can be manually manipulated by the driver to control the throttle at any time during the driving operation without in any way diminishing effective driver control over the vehicle and without changing the vehicle or engine speed in making the transfer.

Another object of the invention is to provide a hand operated throttle control device which is so constructed and installed that the driver can instantaneously transfer therefrom to the conventional accelerating pedal without any interference from the hand operated control device and which can be held by the driver to maintain the desired speed and, upon release thereof by the driver, will automatically return the control of the vehicle to the pedal.

Still another object of the invention is to provide a throttle control device of the aforesaid type which can be readily adjusted to various positions within easy reach of the driver and which, when not in use, retracts to an inconspicuous position, yet always within easy reach of the driver whenever he may wish to transfer control of the vehicle to the hand operated device.

A further object is to provide a hand operated throttle control device which can be readily installed on and removed from a vehicle without any special tools or equipment and without changing the vehicle structure in any manner, and which can be adapted to any standard modern automobile without modification of the vehicle.

Additional objects and advantages of the present invention will become apparent from the following description and accompanying drawings, wherein:

FIGURE 1 is a schematic perspective view of the driver compartment of a standard automobile, showing the present throttle control device installed therein;

FIGURE 2 is an exploded perspective view of the present throttle control device illustrating the manner in which it is mounted on the linkage of the accelerating pedal; and FIGURE 3 is a partial cross sectional view of the present throttle control device showing it mounted on the throttle linkage, the section being taken on line 3—3 of FIGURE 1.

Referring more specifically to the drawings and to FIGURE 1 in particular, numeral 10 designates generally the driver compartment of a standard automobile having therein a steering wheel 12, seat 14, instrument panel 16, brake pedal 18 and accelerating pedal 20. The accelerating pedal is connected to the throttle by a linkage, a portion of which is shown at numeral 22, consisting of a rod projecting through and pivoted on the fire wall of the vehicle. The details of the foregoing parts and mechanisms will not be described in detail herein, since their construction and operation are well known and do not form any direct part of the present invention.

The present throttle control device is shown at numeral 30, mounted on and rigidly secured to throttle linkage 22 and consisting of a cylindrical base 32 having a stud 34 on one end thereof threaded throughout a substantial portion 36. Two clamp members 38 and 40 together form a bore 42 for receiving linkage 22 and firmly engage the external surface of the linkage. Clamp member 38 is provided with a lug 43 with a hole 44 therethrough, and clamp member 40 is provided with a lug 46 with a hole 48 therethrough in alignment with hole 44. The two holes 44 and 48 are adapted to receive stud 34, the stud extending through the two holes with lug 46 seating against shoulder 50 on member 32. After stud 34 has been inserted through holes 44 and 48, a nut 52 is threaded onto threaded portion 36 of the stud and tightened sufficiently to seat lug 46 firmly on shoulder 50, and lug 43 against the inner surface of lug 46, thus drawing the two clamp members 38 and 40 firmly into engagement with throttle linkage 22, thereby securing device 30 rigidly in position on the linkage as shown in FIGURES 1 and 3.

A stem 60 consisting of a tubular base 62 and a rod or smaller tube 64 telescopically seated in base 62 is mounted at right angles on base 32 and is rigidly secured thereto by the seating of the lower end of tubular base 62 in hole 66 of base 32. Tubular base 62 may be brazed, welded, or otherwise secured in hole 66, or it may be rigidly joined to base 32 by any other suitable means. In order to retain telescopic rod 64 in any desired adjusted position, a restricted collar 68 is provided on the upper end of tubular base 62 forming a friction connection between base 62 and rod 64. The upper end of the rod is provided with a button 70 or other type handle to provide a suitable grip for the driver in operating the throttle control device.

The present throttle control device can be readily installed on the throttle linkage by placing the two clamps 38 and 40 on opposite sides of the linkage, inserting stud 34 through holes 44 and 48 and tightening nut 52 on the stud sufficiently to clamp members 38 and 40 rigidly onto the throttle linkage. In mounting the device in the foregoing manner, stem 60 is adjusted to the position illustrated in FIGURE 1; however, this position may be varied over a wide range to satisfy the individual driver's choice. After the device has been mounted on the throttle linkage in the foregoing manner, the throttle is controlled by the operator using rod 64 extended to a point adjacent the steering wheel. As the driver steers the vehicle on, for example, a relatively straight superhighway, he can place his hand on the steering wheel and grasp rod 64 or button 70 and, by moving the rod angularly upwardly or downwardly, as distinguished from axially, he can move the throttle to the position required to obtain and maintain the desired vehicle speed. The rod 64 may be extended or retracted with reference to tubular member 62 to obtain the most convenient and comfortable position for the driver, as well as the most effective control over the throttle. While the device is normally adjusted so that the operator can retain the hand holding the device on the steering wheel, it may be adjusted to a position where he can control the throttle through the device by resting his hand on his knee or on the automobile seat.

Whenever the driver wishes to transfer the control of the automobile to the accelerating pedal, he merely places his foot on accelerating pedal 20 and releases rod 64 or button 70. The control of the throttle is then automatically and instantaneously transferred to the accelerating pedal. If the driver does not intend to use the hand throttle control device further at that time, rod 64 is preferably telescoped into tubular member 62 of stem 60, thus retracting the stem to an inconspicuous position beneath the instrument panel. The throttle control device does not in any way interfere with the proper operation of the accelerating pedal when the device is inoperative.

On most standard automobiles, the throttle linkage is readily available for clamping members 38 and 40 thereon. In the event this is not possible, the two clamps can be used to mount the device in operating position directly on the accelerating pedal. However, in some automobiles, it may be necessary to replace clamp members 38 and 40 with special fixtures for either the throttle linkage or accelerating pedal.

While only one embodiment of the present invention has been described in detail herein, various changes and modifications may be made to satisfy requirements.

We claim:
1. A hand operated throttle control device for use with a vehicle having an accelerating pedal with a rod-like linkage member in the driver compartment, comprising a cylindrical base with an axial stud and shoulder on one end thereof for mounting on said linkage in a horizontal laterally extending position with respect to said linkage member, a pair of clamp members having grooves facing one another for receiving the rod-like linkage member and lugs on one side of said grooves having holes receiving said stud, a nut on said stud for clamping said clamp members together and one against said shoulder to thereby secure said clamp members to said linkage member, a stem extending laterally from the end of said base opposite said stem and consisting of a tubular base portion secured at one end to said base and having a free end, a rod-like member telescopically received in said base portion and extending from the free end thereof, means frictionally engaging said rod-like member to retain it in various adjusted positions in said base portion, and a button secured to the free end of said rod-like member.

2. A hand operated throttle control device for use with a vehicle having an accelerating pedal with a rod-like linkage member in the driver compartment, comprising a base with a stud and shoulder on one end thereof for mounting on said linkage in a horizontal laterally extending position with respect to said linkage member, a pair of clamp members having grooves facing one another for receiving the rod-like linkage member and lugs on one side of said grooves with holes receiving said stud, a nut on said stud for clamping said clamp members together and one against said shoulder to thereby secure said clamp member and to said linkage member, stem extending from said base, and having a telescopic section frictionally retained in adjusted positions.

References Cited by the Examiner
UNITED STATES PATENTS

| | | | |
|---|---|---|---|
| 2,072,285 | 3/37 | Walker | 74—482 |
| 2,130,252 | 9/38 | Snell | 287—54 |
| 2,481,966 | 9/49 | Zivi | 74—481 |
| 2,724,981 | 11/55 | Smart | 74—481 |
| 3,025,089 | 3/62 | Ramsden | 287—54 |

BROUGHTON G. DURHAM, *Primary Examiner.*

MILTON KAUFMAN, *Examiner.*